(12) United States Patent
Fornander et al.

(10) Patent No.: US 12,067,154 B2
(45) Date of Patent: Aug. 20, 2024

(54) SENSOR DATA ASSEMBLY AND MANUFACTURING DEVICE

(71) Applicant: Siemens Energy Global GmbH & Co. KG, Bayern (DE)

(72) Inventors: Jerry Fornander, Finspang (SE); Andreas Graichen, Norrköping (SE); Thomas Jetzfellner, Aschheim (DE); Johan Lindstam, Norrköping (SE); Markus Sauer, Munich (DE); Monika Sturm, Vienna (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 500 days.

(21) Appl. No.: 17/274,179

(22) PCT Filed: Sep. 16, 2019

(86) PCT No.: PCT/EP2019/074709
§ 371 (c)(1),
(2) Date: Mar. 7, 2021

(87) PCT Pub. No.: WO2020/058192
PCT Pub. Date: Mar. 26, 2020

(65) Prior Publication Data
US 2021/0200906 A1    Jul. 1, 2021

(30) Foreign Application Priority Data

Sep. 18, 2018    (EP) .................... 18195210

(51) Int. Cl.
*G06F 16/23* (2019.01)
*B22F 10/80* (2021.01)
(Continued)

(52) U.S. Cl.
CPC .............. *G06F 21/78* (2013.01); *B22F 10/80* (2021.01); *B22F 12/90* (2021.01); *B33Y 50/00* (2014.12);
(Continued)

(58) Field of Classification Search
CPC .... G06F 21/78; G06F 16/2379; G06F 21/602; G06F 21/64; B33Y 50/00; B22F 12/90; B22F 10/80
(Continued)

(56) References Cited

U.S. PATENT DOCUMENTS

| | | | |
|---|---|---|---|
| 9,774,578 B1 * | 9/2017 | Ateniese | ............... G06F 3/0673 |
| 2008/0276092 A1 * | 11/2008 | Eberhardt | ............. H04L 9/3236 |
| | | | 713/175 |

(Continued)

FOREIGN PATENT DOCUMENTS

| | | |
|---|---|---|
| CN | 104765341 A | 7/2015 |
| CN | 105743991 A | 7/2016 |
| WO | 2017167399 A1 | 10/2017 |
| WO | 2017198291 A1 | 11/2017 |

OTHER PUBLICATIONS

Karim El Defrawy; SMART: Secure and Minimal Architecture for (Establishing a Dynamic) Root of Trust; EUROCOM:2017; p. 1-17.*

(Continued)

*Primary Examiner* — Monjur Rahim
(74) *Attorney, Agent, or Firm* — Wolter Van Dyke Davis, PLLC

(57) ABSTRACT

A sensor data assembly providing a secured data storage for monitored data containing sensor data acquired by at least one sensor, a processing unit adapted to provide a cryptographic checksum of the monitored data and/or the sensor data acquired by the sensor, a distributed database and a first connection adapted to, at least temporarily, connect the (Continued)

sensor and the processing unit. A method provides manipulation proof monitored data containing sensor data of a sensor of the sensor data assembly.

20 Claims, 1 Drawing Sheet

(51) Int. Cl.
B22F 12/90 (2021.01)
B33Y 50/00 (2015.01)
G06F 16/60 (2019.01)
G06F 16/64 (2019.01)
G06F 21/60 (2013.01)
G06F 21/64 (2013.01)
G06F 21/78 (2013.01)

(52) U.S. Cl.
CPC ........ *G06F 16/2379* (2019.01); *G06F 21/602* (2013.01); *G06F 21/64* (2013.01)

(58) Field of Classification Search
USPC ............................................. 713/193
See application file for complete search history.

(56) References Cited

U.S. PATENT DOCUMENTS

| | | | |
|---|---|---|---|
| 2011/0225008 A1 | 9/2011 | Elkouh | |
| 2013/0243189 A1* | 9/2013 | Ekberg | H04L 63/123 |
| | | | 380/44 |
| 2015/0358323 A1* | 12/2015 | Mraz | G06F 16/183 |
| | | | 726/4 |
| 2017/0300757 A1* | 10/2017 | Wolf | H04N 23/80 |
| 2018/0191687 A1* | 7/2018 | Munafo | G06F 21/602 |
| 2019/0037012 A1* | 1/2019 | Stöcker | H04L 67/104 |
| 2019/0074962 A1* | 3/2019 | Ateniese | H04L 9/0643 |
| 2019/0089716 A1* | 3/2019 | Stöcker | H04L 67/1078 |
| 2021/0081546 A1* | 3/2021 | Falk | H04W 12/128 |
| 2021/0349443 A1* | 11/2021 | Falk | G06F 21/64 |

OTHER PUBLICATIONS

PCT International Search Report and Written Opinion of International Searching Authority mailed Nov. 27, 2019 corresponding to PCT International Application No. PCT/EP2019/074709 filed Sep. 16, 2019.

* cited by examiner

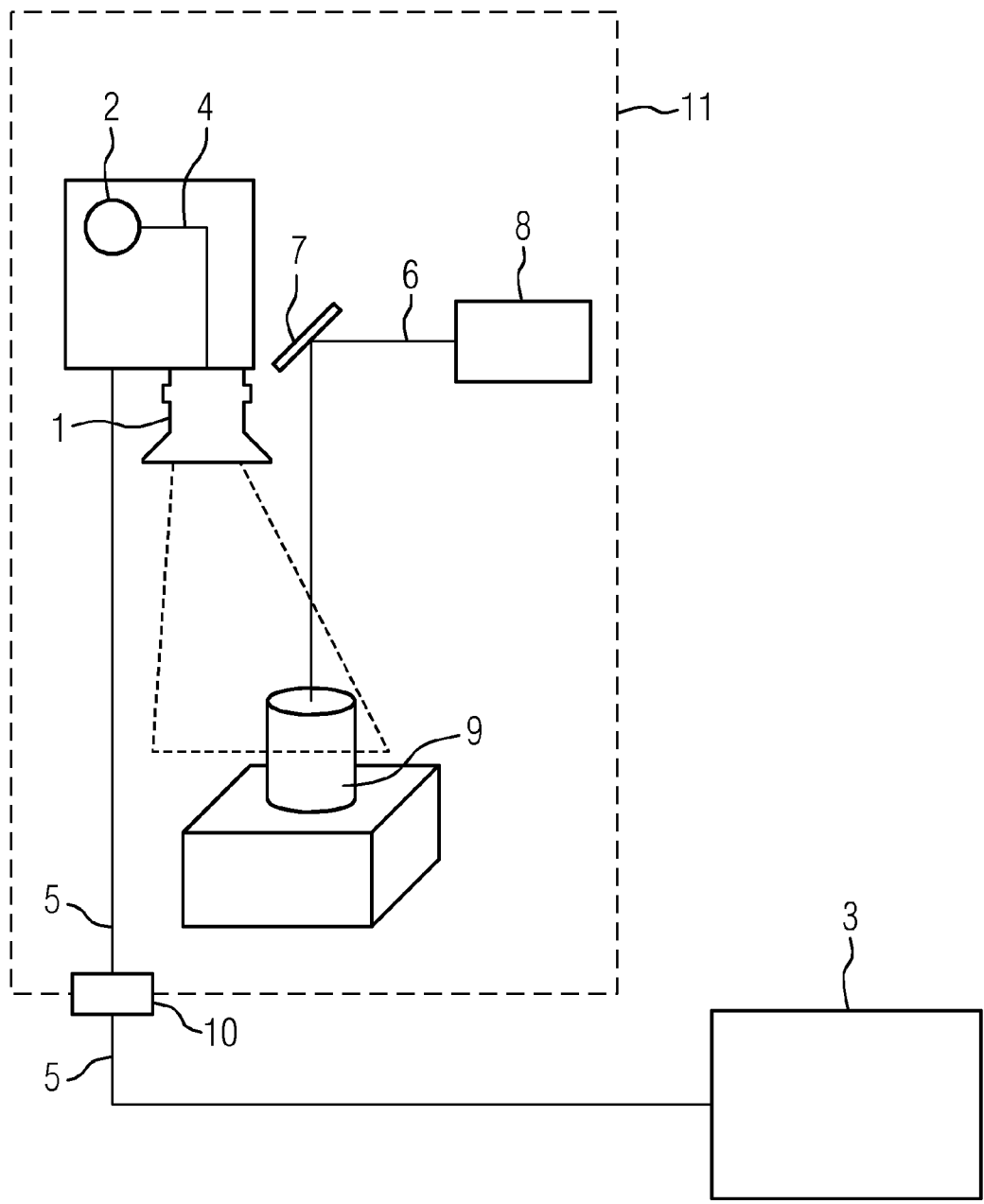

SENSOR DATA ASSEMBLY AND MANUFACTURING DEVICE

CROSS REFERENCE TO RELATED APPLICATIONS

This application is the US National Stage of International Application No. PCT/EP2019/074709 filed 16 Sep. 2019, and claims the benefit thereof. The International Application claims the benefit of European Application No. EP18195210 filed 18 Sep. 2018. All of the applications are incorporated by reference herein in their entirety.

FIELD OF INVENTION

The invention refers to a sensor data assembly to monitor a system and handling the data acquired. Furthermore, the invention refers to a manufacturing device containing at least a part of the sensor data assembly. Furthermore, the present invention refers to a method of handling the sensor data acquired. Furthermore, the present invention refers to a computer program product adapted to perform the inventive method. Furthermore, the present invention refers to a device for providing such computer program product.

BACKGROUND OF INVENTION

Semiautomatic or automatic manufacturing devices are widely used in industrial manufacturing and are continuously the topic of further developments. New methods of manufacturing like additive manufacturing provide great opportunities, however, simultaneously provide new challenges to transfer such methods from research topics to reliable and universal applicable manufacturing devices.

For example, manufacturing methods like additive manufacturing provide the possibility to flexibly adapt the manufacturing to present needs and switch between different products with almost no or no time loss. This allows to bundle such production at central locations, wherein orders are, for example, bundled globally and split up to be produced by the facility just having free capacities. Also such method might not be strictly internally, but could also be used for some external contract worker providing such additive manufacturing capabilities. However, despite the general universal applicability of such processes several problems arise. Minor differences in the controls or deviations from the standards based on, for example, replaced spare parts result in decrease in product quality deemed to be not acceptable to high quality products like being used in streaming engines. Also producing parts flexibly on any manufacturing device simply based on the availability of the device may result in further problems. For example, moving the production to a different manufacturing location meeting the requirements and demands provides further problems. Like to ensure that the required conditions have been met during manufacturing while relying on data collected not by the costumer, but the producer instructed accordingly.

Therefore, there is a need to provide means solving such problems to enable the usage of new methods as flexible and beneficial as they claim to be.

SUMMARY OF INVENTION

These problems are solved by the products and methods as disclosed hereafter and in the claims. Further beneficial embodiments are disclosed in the dependent claims and the further description. These benefits can be used to adapt the corresponding solution to specific needs or to solve further problems.

According to an aspect the invention refers to a sensor data assembly to securely store monitored data containing sensor data acquired by a sensor, containing—a sensor, —a processing unit adapted to provide a cryptographic checksum of the monitored data and/or the sensor data acquired by the sensor, —a distributed database adapted to store the monitored data and the cryptographic checksum, wherein the distributed database is protected against manipulation, and—a first connection adapted to at least temporarily connect the sensor and the processing unit.

The term "monitored data" as used herein refers to data to be monitored during a process like a manufacturing process of a product. Herein, it not only refers to the sensor data explicitly included, but preferably also contains additional information of the corresponding device and/or process. For example, it can also include information regarding the temperature of the manufacturing environment, interruptions of the manufacturing process, unplanned openings of the manufacturing device, error messages, alarm messages, currents like the adjusted current applied to a laser included in the manufacturing device and comparable information.

Such monitored data is, for example, acquired during a manufacturing process of a product using additive manufacturing. Later on this data can be used to review the manufacturing process. For example, it can be checked whether all specifications were met during such manufacturing process. It was noted that such review is especially beneficial for sensor data acquired during such process. It is to be expected that such task becomes more and more important according to a more distributed production of corresponding products. In this context, it should be a very important topic for future production methods like additive manufacturing relying on a multitude of multipurpose devices automatically creating products at different sites. Although, the product should be expected to be the same it was noted that minor differences of the devices and specific parameters that might be included in the corresponding manufacturing process may result in grave differences of the product even possibly rendering it defective. Thus, such topic should become of high relevance of such application despite corresponding costs and additional work associated with it.

Examples of sensors whose data might be secured that way comprise, for example, a temperature based sensor, for example, indirectly detecting the power output of a laser used in selective laser melting (SLM), electron beam used in electron beam melting (EBM) or ray to cure a binder in binder jetting, a flowmeter measuring the real current applied to a component of a manufacturing device like a laser, the temperature of the material to be fused together before, during and/or after the fusion process, an optical sensor detecting the movement of a coating knife applying a new layer of material to be fused together or the quality of a distribution of a powder applied using such coating knife, or an optical sensor acquiring pictures during the manufacturing process. Also it can be some sensor in a device used after a manufacturing process like an additive manufacturing process providing, for example, some data regarding the surface structure and generic form of the product. Typically, it is preferred that it is a sensor used during the manufacturing process.

The protection of the distributed database against manipulation can be realized using methods and means as available to a person skilled in the art. For example, said distributed database can be realized as blockchain to ensure that older data of the blockchain contained in earlier blocks is not manipulated by comparing the connection between older and newer blocks of the blockchain. Furthermore, the distributed database can be realized as encrypted database allowing new data to be added and old data to be retrieved only by a trusted party. Furthermore, it can be a peer-to-peer network allowing only access of a specified persons and/or a correspondingly restricted access.

The term "processing unit" as used herein refers to data processing units as used for processing data. Herein, for example, checksums and cryptographic checksums are generated, smart contracts are executed, measured and predefined values are compared, a reaction to a specific situation is determined, an output is generated, a part of a data set is reconstructed, a checksum, preferably cryptographic checksum, is validated, new blocks for a blockchain are generated, new blocks are integrated in the blockchain, and so on. Such processing unit can, for example, be found in computers, clients, smart phones, and servers. For example, such processing unit can also be found in knots of the distributed database like a blockchain.

According to another aspect the present invention refers to a sensor unit comprising a sensor and a processing unit, more preferred to a blockchain chip, wherein the sensor and the processing unit are inseparably connected, wherein the sensor unit is adapted to be used as the sensor and the processing unit in an inventive sensor data assembly.

According to another aspect the present invention refers to a manufacturing device containing at least a part of an inventive sensor data assembly, wherein the manufacturing device preferably is a manufacturing device for additive manufacturing. Typically, it is preferred that the manufacturing device contains at least the inventive sensor unit.

According to another aspect the present invention refers to a method for providing manipulation proof monitored data containing sensor data of a sensor of an inventive sensor data assembly containing: a) acquiring the sensor data of the sensor, b) calculating a cryptographic checksum of the sensor data and/or the monitored data, c) storing the monitored data and the cryptographic checksum in a distributed database being protected against manipulation.

According to another aspect the present invention refers to a manufacturing process using a manufacturing device, wherein the distributed database contains a smart contract adapted to provide an additional production procedure, wherein the additional production procedure is adapted to provide a specified sensor data, wherein specified sensor data is used to verify the correct execution of the modified production procedure. Typically it is preferred that said additional procedure is a random modified production procedure of the product to be manufactured or a production procedure of a test part adapted to allow the verification of the manufacturing device and its parameters. This especially allows to ensure that no manipulated or reproduced monitored data is forwarded to the distributed database allowing a higher security in especially a trustless situation.

According to another aspect the present invention refers to a computer program product with program commands to perform an inventive method.

According to another aspect the present invention refers to a device for providing an inventive computer program product, wherein the device stores the computer program product and/or provides the computer program product for further use.

Unless specified otherwise terms like "calculate", "process", "determine", "generate", "configure", "reconstruct" and comparable terms refer to actions and/or processes and/or steps modifying data and/or creating data and/or converting data, wherein the data are presented as physical variable or are available as such.

The term "data storage" or comparable terms as used herein, for example, refer to a temporary data storage like RAM (Random Access Memory) or long term data storage like hard drives or data storage units like CDs, DVDs, USB sticks and the like.

The term "smart contract" as used herein especially includes data like program data or data being able to be executed by a program to perform specified steps or actions including control commands, specified values, requirements, interrelated data like measured values and corresponding action in response to fulfilling or not fulfilling predefined values in comparison to said measured values. For example, executing the smart contract can be done by a correspondingly selected distributed database or a runtime environment like a virtual machine. Preferably, such means for executing the smart contract are turing complete. Typically, it is preferred that the smart contract is executed using the infrastructure of the distributed database.

The term "cryptographic checksum" as used herein refers to a data checksum preferably acquired using a cryptographic hash function on the corresponding data or a part of the corresponding data. Furthermore, it can especially refer to a digital signature or a cryptographic authentication code adapted to be used to verify data used to generate the cryptographic checksum to protect against manipulation. Herein, such cryptographic checksum can, for example, be provided for each sensor data acquired or for the complete monitored data. Providing a multitude of cryptographic checksum typically provided a higher protection against manipulation. Providing such cryptographic checksum for, for example, a complete block to be included in the distributed database typically reduces the required workload for the processing unit, but decreases the data security at least slightly.

The term "distributed database" as used herein refers to a decentralized database like a blockchain, a distributed ledger, a distributed data storage system, a distributed ledger technology based system, a manipulation proof database, a cloud, a cloud service, a blockchain in a cloud or a peer-to-peer database. Herein, such distributed database can be a public database like a public blockchain or a non public database like a private blockchain. Typically, it is preferred that such blockchain is non public and can only be accessed by authorized persons. Herein, such access right might also be granted for external persons to allow a review of for example the production data of specific products.

The term "data block" as used herein refers to a block of a distributed database like a blockchain or a peer-to-peer database. It may contain data regarding the size of the data block, a block header, a counter of monitored data, sensor data and/or monitored data. Said block header can, for example, contain a version number, a checksum, or a time stamp.

To simplify the understanding of the present invention it is referred to the detailed description hereafter and the figures attached as well as their description. However, the invention is not to be understood being limited to the embodiments as disclosed in the detailed description as they represent embodiments providing additional benefits to solve specific problems or fulfilling specific needs. Also, the FIGURE is to be understood being not limiting the scope of the present invention, but disclosing a preferred embodiment explaining the invention further.

FIG. 1 shows a schematic drawing of an example of the inventive sensor data assembly, wherein a part of the sensor data assembly is contained in an additive manufacturing device as example of the inventive manufacturing device.

The embodiments hereafter contain, unless specified otherwise, at least one processor and/or data storage unit to implement the inventive method.

According to one aspect the present invention refers to a sensor data assembly as described above.

According to further embodiments the processing unit preferably is a hardware oracle. The term "hardware oracle" as used herein refers to a device containing security elements enabling the device using software security means like cryptographic methods, mechanical security means like lockable enclosing or electronic security means like means deleting the data of the device in case of tampering. Typically, it is preferred that such hardware oracle at least contains cryptographic keys. Typically, it is preferred that the processing unit of the sensor data assembly is a blockchain chip. It was noted that despite the higher costs and requirements resulting from this the possibility to protect the acquired data using hardware means proved to be especially beneficial. For example, it allows to securely provide a manipulation proof data set being a reliable source of data to be verified or used in later review processes of a manufacturing process.

According to further embodiments the processing unit preferably is adapted to encrypt a first data set containing the cryptographic checksum, the monitored data and/or the sensor data, and wherein the distributed database is adapted to directly store the encrypted first data set or decrypt said first data set before it is stored in the distributed database.

According to further embodiments the processing unit preferably is adapted to store the monitored data and the cryptographic checksum in the distributed database. Such direct storage reduces the number of possible points to intercept the data stream and possibly manipulate it.

According to further embodiments the sensor data, the cryptographic checksum or both preferably contain a unique identifier of the sensor. This allows to further increases the data security.

According to further embodiments the sensor data assembly preferably contains at least two, more preferred at least three, sensors. Typically, it is preferred that said sensors are different sensors like selected from the group consisting of optical temperature sensors, non-optical temperature sensors, sensors monitoring the current applied to a laser used in selective laser melting or a electron beam, cameras, sensors measuring the powder flow in the powder flow device, and weight sensors monitoring the weight of the powder bed. This allows to bundle multiple data in the secured data set allowing a more detailed review.

According to further embodiments at least one processing unit preferably is adapted to process the sensor data of at least 2 sensors. For example, this reduces the costs as the number of processing units is reduced. Such case is, for example, especially beneficial if an existing manufacturing device should be upgraded to enable it for the inventive method.

According to further embodiments the sensor data assembly preferably contains at least two sensors and at least two processing units, and wherein at least one, more preferred at least two, even more preferred at least three, processing units are adapted to process the sensor data of a single sensor. Providing a specific processing unit for a single sensor typically allows a faster and more reliable processing. Especially, if the corresponding sensors are deemed to be of high importance for later review this can be very beneficial.

According to further embodiments the sensor data assembly preferably contains a second connection adapted to, at least temporarily, connect the processing unit and the distributed database. Herein, such second connection can be realized, for example, by a cable connection, a wireless connection, a data transport medium like a USB stick, CD or DVD, the like or combinations thereof. For example, the second connection can contain cable connection from the processing unit to a wireless interface, a wireless connection to a second wireless interface being connected to a computer being part of or connected to the distributed database.

According to further embodiments the first connection preferably is adapted to inseparably connect the sensor and the processing unit. Preferably, the first connection is a direct connection like a cable connection from the sensor to the processing unit. Said first connection can also be a part of a circuit board, wherein on part of the circuit board is connected to or part of the sensor and a different part of the circuit board is connected to or part of the processing unit. Typically, it is preferred that the first connection is adapted to provide a protection against manipulation of the data transferred from the sensor to the processing unit. For example, the first connection and the interfaces to the sensor and the processing unit can be enclosed by a casing, wherein said casing is preferably protected against manipulation.

According to further embodiments such distributed database preferably provides a further encryption dividing the data contained therein into subsections. This allows to provide access to specific data for specific persons. It was noted that such method is very beneficial, for example, in case a costumer is granted the right to review the production data of a specific product, while the data regarding other products contained in the distributed database is to be kept secret. Alternatively or additionally the distributed database can be split into at least two sub databases, wherein these sub databases are split up according to, for example, different costumers, an official part and an unofficial part, or the like. For example, such official part can contain the sensor data of different layers of a product produced using additive manufacturing and the construction data of said product. While the unofficial part may contain the specific working conditions of an additive manufacturing device based on the construction data provided by a costumer and the internal know how to realize such structure.

According to further embodiments the sensor data assembly preferably contains a data storage, wherein the data storage is adapted to be consistently connected to processing unit while the sensor is active, and wherein the data storage is adapted to at least temporarily store the monitored data and/or sensor data and the cryptographic checksum. Typically, it is preferred that the data storage is part of the processing unit. This enables to further increase the security of the data, as processing and storing the data acquired is highly localized at the sensor further decreasing the risk of manipulation of the data to be stored in the distributed database.

According to further embodiments the data storage preferably is part of the second connection. Typically, it is preferred that the data storage is connected to at least two, more preferred at least three processing units. This provides, for example, the benefit that for embodiments providing a higher amount of monitored data said data can be stored centrally on such data storage. Also for embodiments, wherein a protected sensor unit comprising the sensor and the processing unit and additionally a data storage is provided, including a greater data storage in such sensor unit results in increased costs. Storing the protected data on a central data storage, thus, can be beneficial for such cases too.

According to further embodiments the sensor data assembly preferably provides a first data storage being part of the processing unit and a second data storage being part of the second connection. This provides, for example, the benefit that even systems providing a temporary connection to the distributed database can be realized without greater costs while keeping a higher level of security. While the primary protection of the sensor data is accomplished by the first data storage and, for example, bundled into small packages each protected the collected data is stored at least temporary on the second data storage until it can be stored in the distributed database. Such systems only requires a small first data storage more securely protected, while the bigger amount of data is stored on the second data storage being more easily secured, as it is, for example, only used to collect the secured data intended to be introduced into the distributed database.

According to further embodiments the data storage, more preferred the first data storage and/or the second data storage, preferably is adapted to execute smart contracts based on the monitored data and/or sensor data. This allows immediately taking action preventing, for example, unnecessary costs based on completing the production procedure of products also clearly being defective in the end. In this context, the data storage, more preferred the first data storage and/or the second data storage, can contain a separate processing unit, or can rely on, for example, the processing unit already available.

According to further embodiments the data storage, more preferred the first data storage and/or the second data storage, even more preferred the second data storage, preferably is adapted to verify the monitored data and/or sensor data before transmission of the monitored data and/or sensor data to the distributed database. Preferably, said verification is based on the cryptographic checksum.

According to further embodiments the data storage, more preferred the first data storage and/or the second data storage, even more preferred the second data storage, preferably is adapted to provide blocks containing the cryptographic checksum, more preferred that cryptographic checksum and the monitored data, adapted to be included in the distributed database.

According to further embodiments the second connection preferably is adapted to consistently connect the processing unit and the distributed database at least when the sensor is generating sensor data.

According to further embodiments the data storage, more preferred the first data storage and/or the second data storage, even more preferred the second data storage, preferably is not consistently connected to the distributed database when the sensor is generating sensor data. Herein, the connection of the data storage and the distributed database can be either only temporarily when the sensor is generating sensor data or even not at all. For example, the data can also be transferred from the data storage to the distributed database batchwise like using a USB stick or connecting regularly using a wireless connection.

According to further embodiments the first connection preferably is secured, preferably using a security casing adapted to prevent a manipulation of a data stream between the sensor and the processing unit. Typically, it is preferred that the first connection and the connection to the optional data storage is secured in such way. For example, such security encasing can provide a mechanism rendering the encryption device hardware defective upon trying to open the security encasing. Typically, it is preferred that the sensor is enclosed in such security encasing to allow only the replacement of the whole unit containing the sensor and the encryption device hardware to avoid connecting some manipulated encryption device hardware in between.

According to further embodiments the distributed database preferably contains a blockchain and/or a peer-to-peer data bank system, more preferred a blockchain. These kinds of distributed databases are especially beneficial for typical applications.

According to further embodiments the distributed database preferably additionally contains a data prioritization unit adapted calculate a priority based on the sensor data, and wherein the priority is stored in the monitored data. This, for example, can be used to prioritize the processing of the monitored data by the distributed database. For example, if monitored data with high priority should be stored in the distributed database system, the difficulty of a cryptographic puzzle is adapted to speed up the validation and storing process. This, for example, can be beneficial in cases where the sensor data indicate an event (e.g., a malfunction of a manufacturing device) which needs preferably taken care of as fast as possible. Additionally or alternatively the distributed database system adjusts the transmission speed of the monitored data within the network of nodes of the distributed database system based on the priority. This, for example, can be beneficial in cases where the monitored data needs to be rapidly transmitted to a specific node of the distributed database system. The specific node is, for example, a specific processing node for high priority sensor data/monitored data which is capable to shut down the manufacturing device and/or manufacturing process to avoid damage of the manufactured product or the manufacturing device/system.

According to another aspect the present invention refers to a sensor unit adapted to be used in an inventive sensor data assembly as described above.

According to further embodiments the sensor unit preferably is protected against tampering as a whole. For example, said sensor unit can be provided as encased unit, wherein opening the encased unit at least without fulfilling specific requirements like electronic or physical keys result in a partial or complete deletion of the data contained therein. Additionally or alternatively such process as opening such casing can be detected to be recorded or directly transmitted to the distributed database.

According to further embodiments the sensor unit preferably contains the data storage. This allows, for example, exchanging this complete part of the assembly being a core part of the security as a whole during a maintenance to decrease the chance of manipulation.

According to another aspect the present invention refers to a manufacturing device containing at least a part of an inventive sensor data assembly, as described above. Typically, it is preferred that the manufacturing device contains at least the sensor, more preferred the sensor and the processing unit, even more preferred the sensor data assembly besides the distributed data storage and a part of second connection adapted to at least temporarily connect the processing unit and the distributed database. Directly providing complete manufacturing devices containing such system, for example, simplifies the integration in an existing fleet or that the costumer ordering some product can rely on certain standards to be met.

According to further embodiments the manufacturing device preferably is an additive manufacturing device, preferably a 3D-printer. Typically, it is preferred that the additive manufacturing device uses selective laser melting, electron beam melting or binder jetting, more preferred selective laser melting or electron beam melting. These types of devices have a high potential and possibility of flexible production, but also suffer easily from slight deviations during the manufacturing process.

According to further embodiments the device preferably contains an encryption device hardware, preferably a blockchain chip, adapted to create the cryptographic checksum. Directly including such specialized hardware, for example, further increases the security and reliability.

According to further embodiments the manufacturing device preferably contains a wireless connection device. Typically, it is preferred that the wireless connection device is part of a second connection to connect the processing unit and the distributed database. Said wireless connection device can be, for example, adapted to wirelessly connect to an interface being itself connected to a computer, a data storage or a network. For example, the computer or data storage can be part of the distributed database or the network can be connected to the distributed database.

According to further embodiments the manufacturing device preferably contains a data storage adapted to be consistently connected to the processing unit while the sensor is active and adapted to at least temporarily store the monitored data and/or sensor data and the cryptographic checksum. Said data storage can also be adapted to store at least a part of the monitored data and/or sensor data like the cryptographic checksums for long term. This, for example, allows reviewing this data later and comparing it with the data of the distributed database.

According to further embodiments the manufacturing device preferably contains a first interface adapted to transmit data containing the monitored data and/or the cryptographic checksum to a transport medium. Examples of such transport medium are USB sticks, CDs, DVDs or comparable media. Typically, it is preferred that the data is stored on the transport medium in encrypted form. In this context, it is preferred that the interface contains or is connected to a device encrypting the data to be stored on the transport medium. The use of such transport medium provides the possibility to prevent a consistent connection of the manufacturing devices to a central network being a possible target of cyberattacks. Herein, the acquired data can be transported batchwise to the distributed database. Such interface can also be part of an alternative second connection to allow an acquisition of the corresponding data even if the primary second connection is damaged.

According to further embodiments the monitored data, the sensor data and/or the cryptographic checksum preferably contain a unique identifier of the manufacturing device. This allows to further increase the security.

According to further embodiments the manufacturing device preferably contains at least one, more preferred at least two, even more preferred at least three, inventive sensor units.

According to another aspect the present invention refers to a method for providing manipulation proof monitored data as described above.

According to further embodiments the monitored data preferably contains sensor data of multiple sensors. This, for example, provides a more detailed data set being available for later reviews.

According to further embodiments the monitored data, the sensor data or the cryptographic checksum preferably contains at least one unique identifier of the sensor or the manufacturing device. This, for example, provides additional means to increase the data security.

According to further embodiments the sensor data and the cryptographic checksum preferably are stored in the distributed database as blocks, wherein the blocks are interconnected, preferably using a cryptographic hash function. This allows to further increase the data security, even if the blocks are, for example, stored on servers possibly being a point of cyberattacks and tries to manipulate the data. Typically, it is preferred that such blocks are part of a blockchain.

According to further embodiments step b) preferably is performed using an encryption device hardware, preferably a blockchain chip. Using such specialized hardware, for example, increases the speed and typically also the security.

According to further embodiments the monitored data, the sensor data and/or the cryptographic checksum preferably are encrypted before they are sent to the distributed database. Typically, it is preferred that they are encrypted before leaving the manufacturing device. Herein, the monitored data and the cryptographic checksum can be encrypted together or separately, preferably together. This, for examples, further increases the data security.

According to further embodiments the method preferably contains step d) after step c), wherein d) the monitored data and/or sensor data is verified using the cryptographic checksum. Such step can be used by a producer to, for example, review the production trying to identify anomalies in the production procedure. Furthermore, it can be used at a later stage to provide proof for a costumer that the requirements were met during production. This might become highly relevant in case of a legal conflict. However, it can also, for example, be used by a costumer to verify the production conditions in case the producer of the product using means like additive manufacturing is only a contract worker and should produce the product according to the specified conditions.

According to further embodiments the method preferably is adapted to provide an essentially regular data stream of the sensor, preferably wherein irregularities of the data stream trigger a predefined action like a corresponding signal, a corresponding notification in the data storage or stopping the current production. Herein, such predefined action and its trigger can be specified, for example, by a smart contract stored in, for example, the distributed database like a blockchain. Herein, an incoming block containing new monitored data can, for example, trigger an evaluation based on such smart contract to identify whether the specified restrictions are met and a certain action has to be triggered. Herein, such action not necessarily lead to, for example, an abortion of a manufacturing process, but can also simply provide a signal or flag for some supervisor or controller to review the process immediately or after the manufacturing process in finished.

Typically, it is preferred that the method is further adapted to differentiate between different intervals of the production to, for example, specify critical phases of the production, wherein interruption are not acceptable, and non critical phases of the production, wherein interruption can be tolerated. This can be, for example used to stop a production in case such interruption leads to a defective product, while the production is maintained in case the product does not suffer from such interruption. This can also be used in case multiple products are produced in multiple layers, wherein the manufacturing device is stopped between two layers of products resulting in no defective products. In this context, different actions can preferably selected for different productions and different parts of one production cycle. The phrase "essentially regular data stream" as used herein refers to a data stream having a predefined time interval for providing new data like the monitoring data and the cryptographic checksum for the distributed database. Herein, it is referred to the real time and not the time of providing the data to the distributed database. Especially, if the sensor data assembly is not directly and consistently connected to the distributed database during the time of activity of the sensor, the acquired monitored data and/or sensor data can be temporarily stored in a data storage to collect the data until the next block or block are send to the distributed database. Herein, a smart contract contained in the distributed database can also be downloaded to the data storage to provide the possibility to consistently perform checks and reviews based on such smart contract even at times when there is temporarily no connection to the distributed database.

According to further embodiments predefined monitored data and/or sensor data preferably triggers a predefined action, preferably wherein the method is used for a manufacturing process using a manufacturing device, wherein the predefined monitored data monitors the manufacturing process, and wherein the predefined action influences or stops the manufacturing process, provides a signal to the personal supervising the manufacturing device and/or generates additional data to be included in or attached to the monitored data. Herein, it is typically preferred that a smart contract is used.

According to further embodiments a smart contract preferably is used to control the predefined action triggered by the predefined monitored data, wherein preferably the smart contract is stored in the distributed database.

According to a further aspect the present invention preferably refers to a computer program product with program commands to perform the inventive method as specified above.

According to a further aspect the present invention preferably refers to a device for providing an inventive computer program product as specified above.

Hereafter, the invention is described based on a specific example as shown in the FIGURE. Herein, it is to be understood that said FIGURE is only meant for the purpose to illustrate the invention and not to restrict the scope claimed herein. Said scope is only limited by the claims as attached hereto.

BRIEF DESCRIPTION OF THE DRAWINGS

FIG. 1 shows a schematic drawing of an example of the inventive sensor data assembly, wherein a part of the sensor data assembly is contained in an additive manufacturing device 11 as example of the inventive manufacturing device 11.

DETAILED DESCRIPTION OF INVENTION

Herein, said the sensor 1 being part of the inventive sensor data assembly provides sensor data being securely stored with other monitored data in a distributed database 3. In this context, the sensor 1 provides the sensor data through the first connection 4 to the processing unit 2 being also part of the sensor data assembly. Said unit of sensor 1 and processing unit 2 form a sensor unit. Said processing unit 2 being a blockchain chip provides a cryptographic checksum of the sensor data. Said cryptographic checksum is stored along the monitored data in the distributed database 3 by means of the second connection 5 connecting the processing unit 2 and the distributed database 3.

The sensor 1 and the processing unit 2 are inseparably connected to directly forward the sensor data to the processing unit 2 while the sensor 1 is active. Furthermore, the first connection 4 connecting these parts of the sensor data assembly is protected against manipulation by a secured casing enclosing the data stream outlet of the sensor, the first connection 4 and the data stream inlet of the processing unit 2. Said secured casing is further adapted to delete the cryptographic keys and further detailed data relating to the data security functions in case the secured casing is opened by unauthorized personal.

The distributed database 3 is in the form of a blockchain to protect itself against manipulation. Herein, the monitored data and the cryptographic checksum are stored in blocks of the blockchain, wherein the monitored data of a single product 9 can be stored in a single block or split up between different blocks. The references of the blocks to each other allow identifying later modifications and providing a reliable data source to be reviewed by the user of the additive manufacturing device 11 or the costumer ordering the product 9 to be produced. For example, such connection between the blocks can be achieved using a cryptographic hash function.

Not shown in the schematic drawing are the second sensor 1 and the second processing unit 2 being included in this example of the inventive sensor data assembly. Said second sensor 1 is adapted to measure the current applied to the laser 8 and forms a sensor unit together with the second processing unit 2. Herein, the second processing unit 2 is directly connected to the second sensor, wherein the connection between these parts of the sensor data assembly is also secured against manipulation.

Furthermore, the sensor data assembly provides a data storage including an interface 10 being adapted to be consistently connected to processing unit 2 while the sensor 1 is active. This allows the data stream to be continuously stored in the data storage without requiring separate data storages for the first and second processing unit 2. Herein, the data storage is adapted to execute smart contracts based on reviewing the monitored data and/or sensor data. Said smart contract is preferably downloaded from the distributed database 3 onto the data storage to be consistently available even if the connection to the distributed database 3 is interrupted. For example, it can review the sensor data of the first sensor 1 to detect damages and irregularities of the product 9 during the manufacturing process and may enforce based on predefined parameters whether the control personal is notified or even the production process is stopped. Same applies for the sensor data of the second sensor 1 monitoring the current applied on the laser 8. In case of fluctuations or too low energy consumption indicating an insufficient melting of the metal powder used in the additive manufacturing device 11 said data storage is adapted to detect such situation and also trigger an corresponding signal, recording said event in the monitored data or stop the production process to avoid a waste of time and material for finalizing a defective product 9.

Furthermore, the data storage acts as temporary backup solution in case the second connection 5 between the data storage and the distributed database 3 is interrupted. In such case the monitored data and the cryptographic checksum are stored on the data storage until the connection to the distributed database 3 is reestablished.

Additionally, the data storage provides means to verify the monitored data, preferably the sensor data, based on the cryptographic checksum to ensure that the data has not been manipulated to this point. This allows a further increased security and that the data storage can furthermore directly provide the new blocks of the blockchain of the distributed database 3. Such arrangement further reduces the risks of intermediary manipulations and the performance requirements of the distributed database 3, as the major part of calculation/encryption is located at the device generating the data. Especially in case the use of a blockchain containing the monitored data of many manufacturing devices 11 the processing capacities of the distributed database 3 are not temporarily exceeded based on a huge amount of monitored data being forwarded simultaneously by a multitude of manufacturing devices 11 sending the data at the same time. As each manufacturing device 11 being active and providing data provides its own processing capacities such a bottleneck can be avoided. Herein, a network of multiple data storages of multiple manufacturing devices 11 can also be used, wherein the network as a whole creates the next block of the blockchain of the distributed database 3.

The sensors 1, processing units 2, first connection 4, data storage and a part of the second connection 5 are part of the additive manufacturing device 11. Herein, the additive manufacturing device 11 uses selective laser 8 melting to produce the product 9. The laser 8 generates a beam 6 being controlled by a mirror 7 to selective melt layer of a metal powder. After melting a layer a new powder layer is applied and the melting process starts anew. This allows to directly produce products 9 providing a complex form with little restrictions, wherein even shapes are possible not being able to be realized using traditional production methods. However, such layerwise building process also provides the problem that fluctuations of the laser 8 or non homogenous application of the metal powder may result in deviations from the form of the desired product 9 and/or structural weaknesses resulting, for example, from incomplete melting at specific locations. Therefore, such production method benefits greatly from the inventive sensor data assembly providing reliable data to evaluate the production quality even in a trustless manufacturer-customer situation. Furthermore, the possibility to securely combine such reliable data with smart contracts allows to avoid the production of defective products 9 to be sorted out at a later stage. For example, based on corresponding signals generated the control personal can correct deficiencies in time or the production process can be stopped in time to avoid the needless loss of production time and material.

The present invention was only described in further detail for explanatory purposes. However, the invention is not to be understood being limited to these embodiments as they represent embodiments providing additional benefits to solve specific problems or fulfilling specific needs. The scope of the protection should be understood to be only limited by the claims attached.

The invention claimed is:

1. A sensor data assembly to securely store monitored data containing sensor data acquired by a sensor, comprising:
    a sensor,
    a processing unit adapted to provide a cryptographic checksum of the monitored data and/or the sensor data acquired by the sensor,
    a distributed database adapted to store the monitored data and the cryptographic checksum, wherein the distributed database is protected against manipulation, and
    a first connection adapted to at least temporarily connect the sensor and the processing unit;
    wherein the sensor and the processing unit are inseparably connected and wherein the first connection comprises one of:
        a direct connection including a cable connection from the sensor to the processing unit, and
        a circuit board, wherein a first part of the circuit board is connected to the sensor and a different second part of the circuit board is connected to the processing unit.

2. The sensor data assembly according to claim 1, wherein the first connection comprises the circuit board including the first part connected to the sensor and the different second part connected to the processing unit.

3. The sensor data assembly according to claim 1, wherein the first connection is configured to protect data transferred between the sensor and the processing unit against manipulation; and
    wherein the first connection includes a mechanism to either delete data transferred between the sensor and the processing unit or to render one of the sensor and the processing unit defective upon detection of manipulation of the first connection.

4. The sensor data assembly according to claim 1,
    wherein the sensor data assembly contains a data storage,
    wherein the first connection is adapted to consistently connect the sensor and the processing unit at least while the sensor is active,
    wherein the data storage is adapted to be consistently connected to the processing unit at least while the sensor is active, and
    wherein the data storage is adapted to, at least temporarily, store the monitored data and/or sensor data and the cryptographic checksum.

5. The sensor data assembly according to claim 4,
    wherein the data storage is adapted to execute smart contracts based on the monitored data and/or sensor data.

6. The sensor data assembly according to claim 1,
    wherein the distributed database contains a blockchain and/or a peer-to-peer data bank system.

7. The sensor data assembly according to claim 1, wherein the first connection is configured such that only replacement of both the sensor and the processing unit is allowed to avoid connection of a manipulated device between the sensor and the processing unit.

8. A sensor unit comprising:
    a sensor, and
    a processing unit,
    wherein the sensor and the processing unit are inseparably connected,
    wherein the sensor unit is adapted to be used in a sensor data assembly according to claim 1.

9. A manufacturing device comprising:
    at least a part of a sensor data assembly according to claim 1.

10. A method for providing manipulation proof monitored data containing sensor data of a sensor of a sensor data assembly according to claim 1, the method comprising:
    a) inseparably connecting the sensor and the processing unit with the first connection;
    b) acquiring the sensor data of the sensor,
    c) calculating a cryptographic checksum of the sensor data and/or the monitored data, and
    d) storing the monitored data and the cryptographic checksum in a distributed database being protected against manipulation.

11. The method according to claim 10,
    wherein step c) is performed using an encryption device hardware.

12. The method according to claim 10,
wherein the method comprises step e) after step d),
wherein e) the monitored data and/or the sensor data is verified using the cryptographic checksum.

13. The method according to claim 10,
wherein predefined monitored data and/or sensor data triggers a predefined action.

14. A non-transitory computer readable media, comprising:
program commands stored thereon and adapted to perform the method according to claim 10.

15. The sensor data assembly according to claim 2,
wherein the processing unit is a blockchain chip.

16. The manufacturing device of claim 9,
wherein the manufacturing device is a manufacturing device for additive manufacturing.

17. The method according to claim 11,
wherein step c) is performed using a hardware oracle.

18. The method according to claim 11,
wherein step c) is performed using a blockchain chip.

19. The method according to claim 13,
wherein the method is used for a manufacturing process using a manufacturing device,
wherein the predefined monitored data monitors the manufacturing process, and
wherein the predefined action influences or stops the manufacturing process, provides a signal to the personal supervising the manufacturing device and/or generates additional data to be included in or attached to the monitored data.

20. A sensor data assembly to securely store monitored data containing sensor data acquired by a sensor, comprising:
a sensor,
a processing unit adapted to provide a cryptographic checksum of the monitored data and/or the sensor data acquired by the sensor,
a distributed database adapted to store the monitored data and the cryptographic checksum, wherein the distributed database is protected against manipulation, and
a first connection adapted to at least temporarily connect the sensor and the processing unit;
wherein the sensor and the processing unit are inseparably connected and wherein the first connection comprises a secured casing enclosing a data stream outlet of the sensor, the first connection and a data stream inlet of the processing unit;
wherein the secured casing is adapted to delete the cryptographic checksum based on opening the secured casing; and
wherein the sensor and the processing unit are inseparably connected to directly forward the sensor data from the sensor to the processing unit while the sensor is active.

* * * * *